(12) United States Patent
King, Jr.

(10) Patent No.: US 7,889,476 B2
(45) Date of Patent: Feb. 15, 2011

(54) ELECTRONICS FOR MULTIPOLE REMOTE OPERATED RELAY

(75) Inventor: William A King, Jr., Loganville, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 1104 days.

(21) Appl. No.: 11/635,299

(22) Filed: Dec. 7, 2006

(65) Prior Publication Data

US 2008/0084648 A1 Apr. 10, 2008

Related U.S. Application Data

(60) Provisional application No. 60/826,623, filed on Sep. 22, 2006.

(51) Int. Cl.
*H02H 3/00* (2006.01)
(52) U.S. Cl. ........................................ 361/160; 361/62
(58) Field of Classification Search ............ 361/62–69, 361/160; 200/50.32
See application file for complete search history.

(56) References Cited

U.S. PATENT DOCUMENTS

| | | | | |
|---|---|---|---|---|
| 5,289,148 A | * | 2/1994 | Siglock et al. ............. | 335/202 |
| 5,861,683 A | * | 1/1999 | Engel et al. ................... | 307/38 |
| 6,140,896 A | | 10/2000 | Heckenkamp | |
| 6,787,937 B2 | * | 9/2004 | Mody et al. .................. | 307/115 |
| 2007/0064377 A1 | * | 3/2007 | DeBoer et al. .............. | 361/637 |
| 2008/0041704 A1 | * | 2/2008 | McCoy ..................... | 200/50.32 |

FOREIGN PATENT DOCUMENTS

| | | |
|---|---|---|
| DE | 3843944 A1 | 6/1990 |
| EP | 07113052.0-2214 | 5/2008 |
| WO | WO2007/033169 A2 | 3/2007 |

* cited by examiner

*Primary Examiner*—Danny Nguyen
(74) *Attorney, Agent, or Firm*—Jose R. de la Rosa

(57) ABSTRACT

An electrical distribution system for selectively connecting an electrical power source to load devices comprises a panelboard having a plurality of load circuit positions. A remote operated relay is mountable in the panelboard in an adjacent pair of the load circuit positions comprising a multipole switching device, and a switch control for controlling the switching device, the switch control comprising a control circuit for operating the switching device responsive to control commands and a communication circuit for receiving control commands. An input/output (I/O) controller is mounted in the panelboard for controlling operation of the remote operated relay, the I/O controller comprising a programmed controller for generating the control commands for commanding operation of the remote operated relay, the control system including a communication circuit for communication with the remote operated relay communication circuit.

17 Claims, 6 Drawing Sheets

ELECTRONICS FOR MULTIPOLE REMOTE OPERATED RELAY

CROSS REFERENCE TO RELATED APPLICATIONS

This application claims priority of provisional application No. 60/826,623 filed Sep. 22, 2006, the contents of which is incorporated by reference herein.

FIELD OF THE INVENTION

This invention relates generally to residential and commercial electrical power distribution panels and components, and more particularly, to a multipole remote operated relay in an electrical power distribution system.

BACKGROUND OF THE INVENTION

Circuit breaker panels are used to protect electrical circuitry from damage due to an overcurrent condition, such as an overload, a relatively high level short circuit, or a ground fault condition. To perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle.

In the overcurrent condition, all the pairs of separable contacts are disengaged or tripped, opening the electrical circuitry. When the overcurrent condition is no longer present, the circuit breaker can be reset such that all the pairs of separable contacts are engaged, closing the electrical circuitry.

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

Switchgear and switchboard are general terms used to refer to electrical equipment including metal enclosures that house switching and interrupting devices such as fuses, circuit breakers and relays, along with associated control, instrumentation and metering devices. The enclosures also typically include devices such as bus bars, inner connections and supporting structures (referred to generally herein as "panels") used for the distribution of electrical power. Such electrical equipment can be maintained in a building such as a factory or commercial establishment, or it can be maintained outside of such facilities and exposed to environmental weather conditions. Typically, hinge doors or covers are provided on the front of the switchgear or switchboard sections for access to the devices contained therein.

In addition to electrical distribution and the protection of circuitry from overcurrent conditions, components have been added to panels for the control of electrical power to loads connected to circuit breakers. For example, components have been used to control electrical power for lighting.

One system used for controlling electrical power to loads utilizes a remote-operated circuit breaker system. In such a system, the switch unit of the circuit breaker operates not only in response to an overcurrent condition, but also in response to a signal received from a control unit separate from the circuit breaker. The circuit breaker is specially constructed for use as a remote-operated circuit breaker, and contains a motor for actuating the switch unit.

In an exemplary remote-operated circuit breaker system, a control unit is installed on the panel and is hard-wired to the remote-operated circuit breaker through a control bus. When the switch unit of the circuit breaker is to be closed or opened, an operating current is applied to or removed from the circuit breaker motor directly by the control panel. Additional, separate conductors are provided in the bus for feedback information such as contact confirmation, etc., for each circuit breaker position in the panel. The control unit contains electronics for separately applying and removing the operating current to the circuit breakers installed in particular circuit breaker positions in the panel. The panel control unit also has electronics for checking the state of the circuit breaker, diagnostics, etc. One advantage of that system is that the individual circuit breakers can be addressed according to their positions in the panel.

Operation of remote operated circuit breakers becomes more difficult when the need exists for a two or three pole unit to provide multiple sets of contacts. A plurality of single pole devices may be operated at the same time to simulate a multipole device. However, timing issues exist with such a configuration. Also, if one of the devices fails or is operated oppositely to that intended improper load operation could result. Moreover, separate control circuitry is necessary for each of the individual single pole units. Previously, such circuitry has been external to the switching device due to component size and the amount of power required. Locating communication circuitry outside the switching device necessitates the circuitry always being present in the panelboard even if the switching device is not.

The present invention is directed to a multipole relay device.

SUMMARY OF THE INVENTION

In accordance with the invention, there is provided a multipole remote operated relay in an electrical power distribution system.

In accordance with one aspect of the invention there is disclosed a remote operated device for selectively distributing electrical power from an electrical power source to load circuits comprising a housing mountable in a distribution panel. A multipole switching device is in the housing. A switch control in the housing controls the switching device. The switch control comprises a control circuit for operating the switching device responsive to control commands and a communication circuit for receiving control commands from a remote controller.

It is a feature of the invention that the multipole switching device comprises first and second relays.

It is another feature of the invention that the first and second relays are parallel connected to the control circuit. The first and second relays may be mechanically linked.

It is a further feature of the invention that the multipole switching device comprises first and second magnetically held solenoids. The control circuit may develop relatively short duration latch and unlatch signals to the solenoids. Duration of the latch signal is greater than duration of the unlatch signal.

It is still another feature of the invention to use a sensing devise for sensing position of the switching devices. The multipole switching device may comprises first and second relays and the sensing device may comprise auxiliary contacts.

There is disclosed in accordance with another aspect of the invention an electrical distribution system for selectively connecting an electrical power source to load devices, comprising a panelboard having a plurality of load circuit positions. A remote operated relay is mountable in the panelboard in an adjacent pair of the load circuit positions comprising a multipole switching device, and a switch control for controlling the switching device, the switch control comprising a control circuit for operating the switching device responsive to control commands and a communication circuit for receiving control commands. An input/output (I/O) controller is mounted in the panelboard for controlling operation of the remote operated relay, the I/O controller comprising a programmed controller for generating the control commands for commanding operation of the remote operated relay, the control system including a communication circuit for communication with the remote operated relay communication circuit.

Further features and advantages of the invention will be readily apparent from the specification and the drawings.

DETAILED DESCRIPTION OF THE INVENTION

An electrical distribution system, such as an integrated lighting control system, in accordance with the invention permits a user to control power circuits typically used for lighting, as well as circuits for resistive heating or air conditioning, using multipole remote operated relays. The electrical distribution system may be as is generally described in U.S. application Ser. No. 11/519,727, filed Sep. 12, 2006, the specification of which is incorporated by reference herein.

Figure 1:
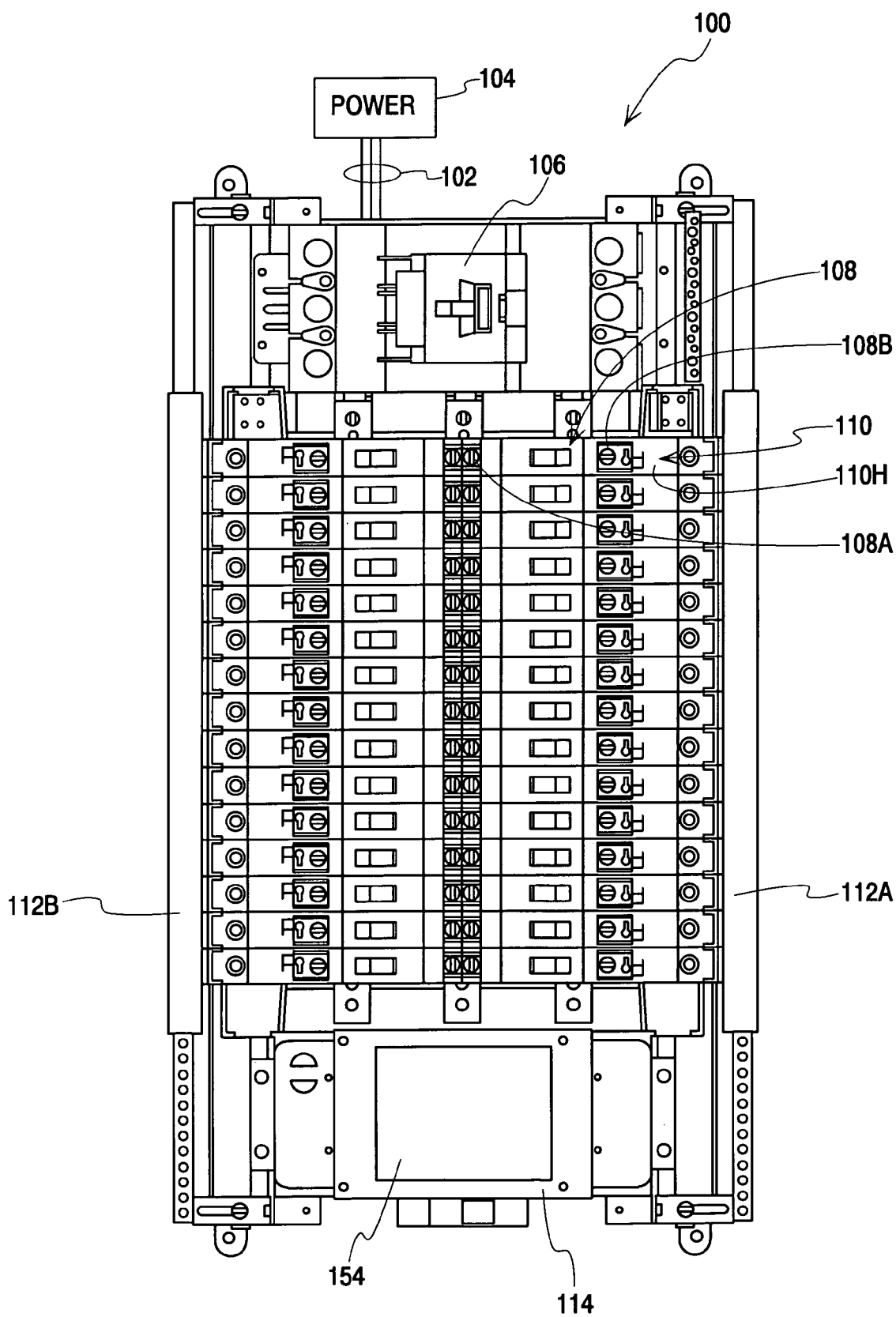
FIG. 1 is an elevation view of a power distribution panel according to the invention.

Referring to FIG. 1, a lighting control system in accordance with the invention comprises a lighting control panel 100. The panel 100 may comprise a Siemens type P1 panelboard, although the invention is not limited to such a configuration. Line power enters the panel 100 through power source cables 102 connected to a source of power 104. Line power may, for example, be a three phase 480Y277, 240 or 120 VAC power source, as is conventional. The cables 102 are electrically connected to an input side of a main breaker 106. The main breaker 106 distributes line power to individual circuit breakers 108 in a conventional manner. How the power is distributed depends on design of the individual circuit breakers 108, as will be apparent to those skilled in the art. The power is distributed to the line side of individual circuit breakers 108. The panel 100 may be configured to accept up to forty two individual circuit breakers 108, although only thirty are shown in the embodiment of FIG. 1. Each circuit breaker may be of conventional construction and may be, for example, a Siemens BQD circuit breaker. Each circuit breaker 108 includes a line terminal 108A receiving power from the main breaker 106 and a load terminal 108B conventionally used for connecting to a load circuit.

For simplicity of description, when a device such as a circuit breaker 108 is described generally herein the device is referenced without any hyphenated suffix. Conversely, if a specific one of the devices is described it is referenced with a hyphenated suffix, such as 108-1.

In accordance with the invention, each load circuit to be controlled also has a remote operated device 110, such as a relay, a meter or a dimmer. The term remote operated device as used herein includes any other devices that controls, monitors or may otherwise be used in a load circuit, in accordance with the invention. While in a preferred embodiment, the remote operated device 110 is a separate component from the circuit breaker 108, the term "remote operated device" as used herein encompasses devices integral with the circuit breaker. The remote operated devices 110 are also connected to data rails 112A and 112B. A panel controller 114 controls the remote operated devices 110 through connections provided via the data rails 112A and 112B, as discussed below.

The remote operated device 110 includes a housing 110H encasing an auxiliary set of contacts that can be remotely operated to open and close a lighting circuit. The device 110 is attached to the load side of a circuit breaker 108 within a panel 100 using a conductor tab, i.e, the terminal 110A, inserted into the breaker lug 108B. The load terminal 110B comprises a lug of the same size as the breaker lug 108B for connecting to a wire to be connected to the load device. The device housing 110H is configured to mount in a Siemens type P1 panelboard, although the invention is not limited to such a configuration.

Figure 2:
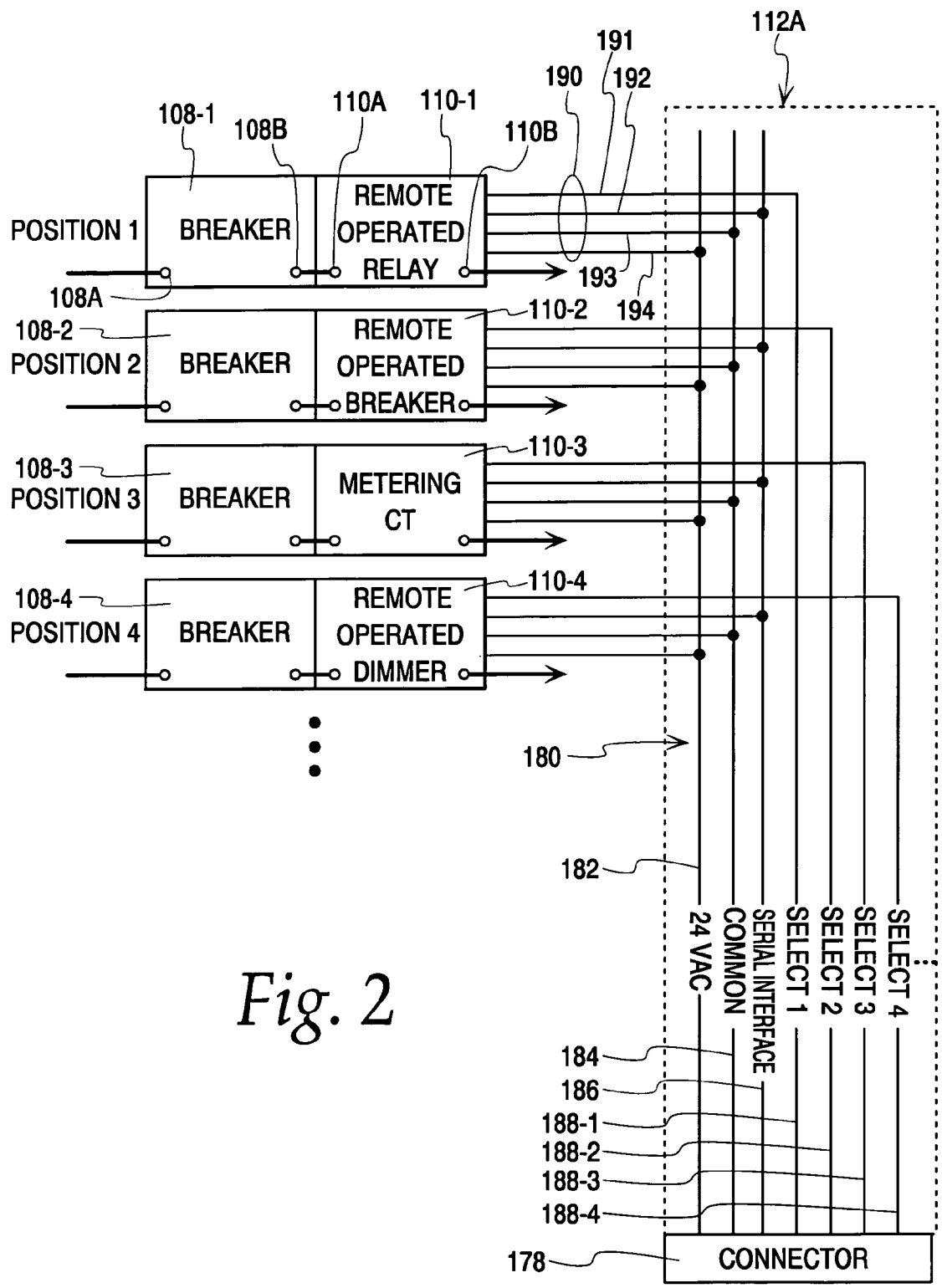
FIG. 2 is a block diagram illustrating pairs of circuit breakers and remote operated devices of the power distribution panel of FIG. 1.

Referring to FIG. 2, a block diagram illustrates four circuit breakers 108-1, 108-2, 108-3 and 108-4, and respective associated remote operated devices 110-1, 110-2, 110-3 and 110-4. In the illustrated embodiment, the first device 110-1 comprises a relay, the second device 110-2 comprises a breaker, the third device 110-3 comprises a current transformer, and the fourth device 110-4 comprises a dimmer. As is apparent, any combination of these remote operated devices 110 could be used. Each remote operated device 110 includes an input terminal 110A electrically connected to the associated circuit breaker load terminal 108B, and an output terminal 110B for connection to a load device.

Figure 3:
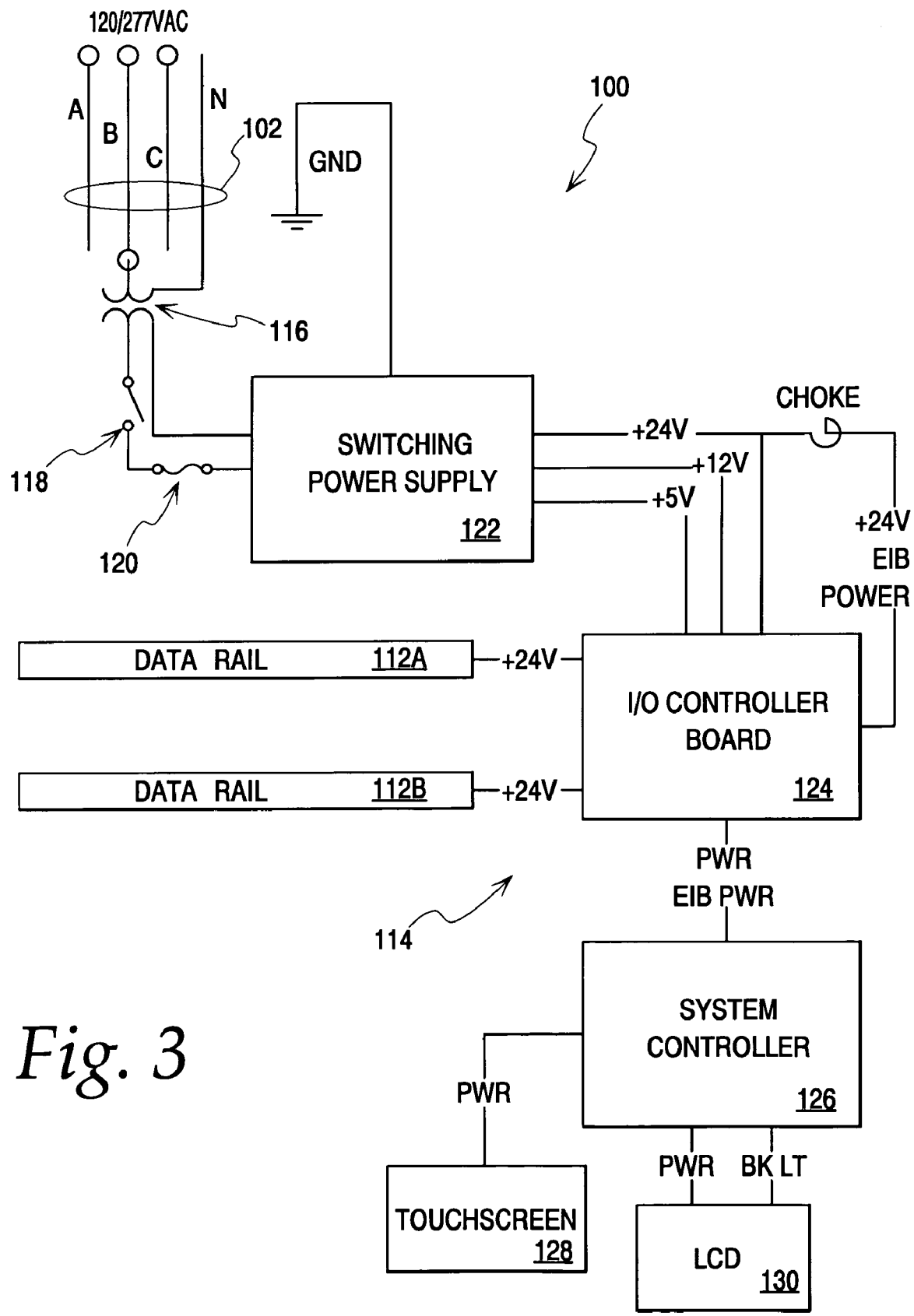
FIG. 3 is a block diagram of the power distribution panel of FIG. 1.

Referring to FIG. 3, a block diagram of the lighting control panel 100 is illustrated. Power from the lines 102 is provided via an isolation transformer 116, power switch 118 and fuse 120 to a switching power supply 122. The panel controller 114 comprises an input/output (I/O) controller 124 and optionally a system controller 126. The power supply 122 provides isolated power to all of the control components including the I/O controller board 124, the system controller 126, and the remote operated devices 110, see FIG. 1, via the data rails 112A and 112B. The I/O controller 124 and system controller 126 each have DC-DC converters deriving regulated DC voltage levels as required from the main DC output of the power supply 122. The power supply 122 also provides 24 volts to the remote operated devices 110. The system controller 126 is operatively connected to a touch screen 128 and an LCD 130.

Figure 4:
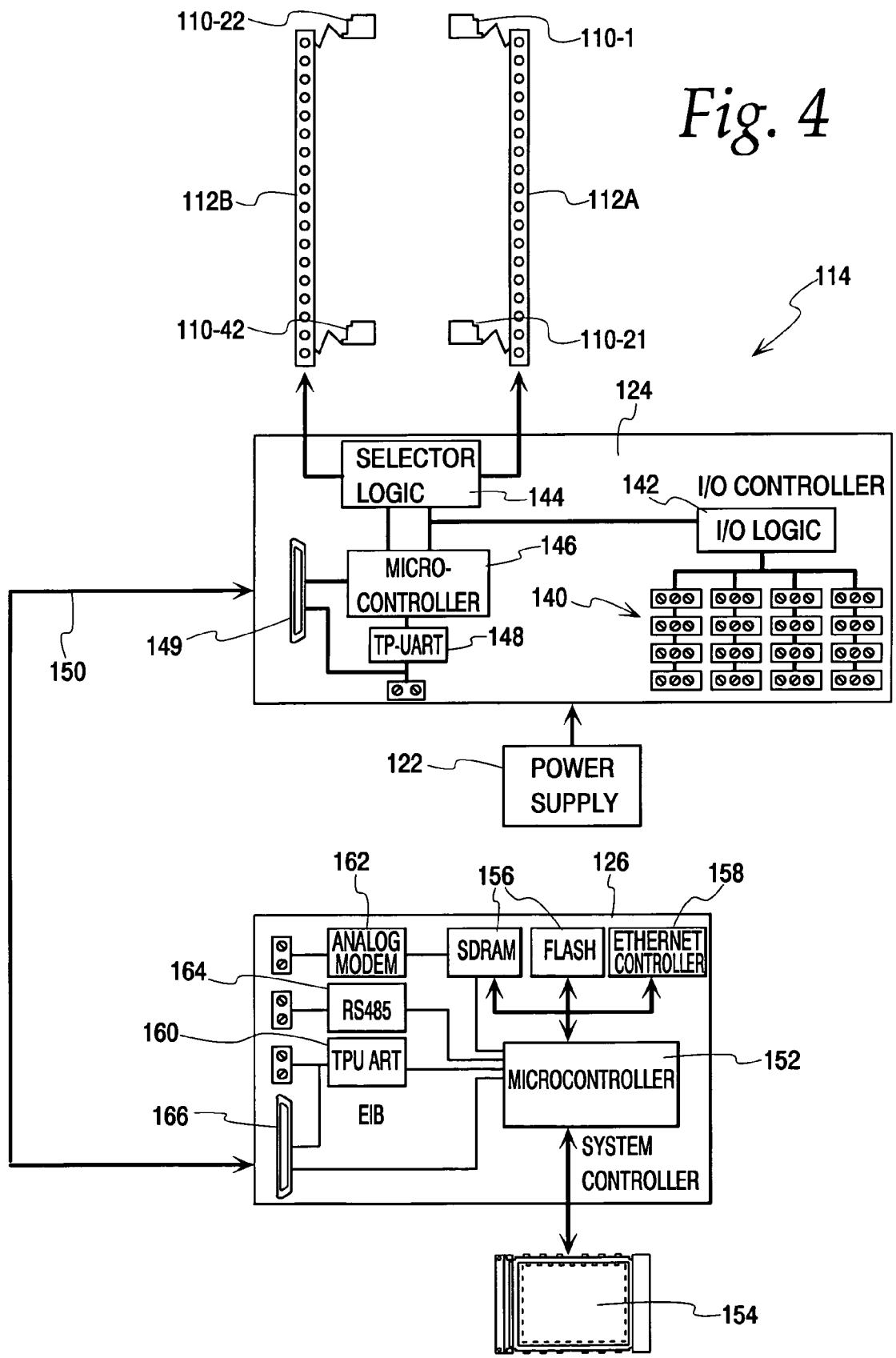
FIG. 4 is an expanded schematic/block diagram of the power distribution panel of FIG. 1.

In one embodiment of the invention, shown in FIG. 4, the panel controller 114 functions as a single panel stand alone system. The I/O controller 124 supplies power and control signals through the rails 112A and 112B to the remote operated devices, four of which, 110-1, 110-21, 110-22 and 110-42, are illustrated. A user interface and high level scheduling and control are provided by the system controller 126.

The I/O controller 124 provides discrete inputs to the controller 114 from dry contact switches, such as wall switches, (not shown) which can be connected to discrete input terminals 140. The terminals 140 are organized as two inputs and a common. The inputs to the terminals 140 are detected by dry contact I/O logic 142. A selector logic block 144 generates selector line signals and serial communications to the remote operated devices 110 via the data rails 112. The logic blocks 142 and 144 are operatively associated with a microprocessor or microcontroller 146. A TP-UART integrated circuit 148 provides an EIB (European Installation Bus) interface. A connector 149 allows mating directly to the system controller 126 via a cable 150.

The system controller 126 provides the user with an application to implement lighting schedules, organize devices into logical groups, manage the inputs, and obtain status information. The system controller 126 includes a microprocessor 152 operatively connected to a user interface 154 in the form of an integrated touch screen 128 and LCD 130, see Fig. H. The microprocessor 152 is also connected to memory devices 156 and an ethernet controller 158. A TP-UART circuit 160 provides an EIB interface while additional interfaces are provided via an analog modem 162 and RS 485 interface circuit 164. A connector 162 is provided for connection to the cable 150.

Referring again to FIG. 2, a data rail 112 is illustrated schematically. The data rail 112 is mechanically attached directly to the interior of the lighting control panel 100. The data rail 112 comprises a shielded communication bus including a ribbon connector 178 having twenty-five to twenty-nine wires to be routed to the I/O controller board 124. The ribbon connector 178 typically has twenty-six wires, two for power connection, two for ground connection, one for the serial line and up to twenty-one select lines, one for each remote operated device 110. Each data rail 112 provides a barrier to isolate the class 1 load wires from the class 2 signal wires used to manage the devices 110. The data rails 112 will connect to each device 110 via a connector that extends out of the device 110. The wires are connected to a printed circuit board 180 included traces defined as follows. A power trace 182 provides 24 volt DC power to each remote operated device 110. A common trace 184 provides a ground to each remote operated device 110. A serial interface trace 186 provides serial communication to each of the remote operated devices 110. A plurality of select line traces, four of which 188-1, 188-2, 188-3 and 188-4 are illustrated, are provided, one for each remote operated device 110. Each remote operated device 110 includes a four wire cable 190 for connection to the data rail 112. The four wires comprise a select line 191 connected to one of the select traces 188, a serial interface line 192 connected to the serial interface trace 186, a neutral wire 193 connected to the common trace 184 and a power wire 194 connected to the power trace 182.

In accordance with the invention, a unique select line is assigned to each breaker 108/remote operated device 110 pair positioned within the lighting control panel 100. Select lines are used by the I/O controller 124 to select single remote operated devices to communicate via the serial interface trace 186. For example, when the first select line 188-1 is asserted, the first remote operated device 110-1 listens for messages on the serial interface line 186. Conversely, messages on the serial interface 186 are ignored if the first select line 188-1 is not asserted. A response by any of the remote operated devices 110 to a serial command is therefore conditional on whether its particular select line is asserted. The term "asserted", as used herein, means one state of a signal designated to cause the remote operated device to listen for messages. In a preferred embodiment, the select line has "high" and "low" states, the high state being the asserted state.

The remote operated device 110, in the form of a relay, allows remote switching of an electrical branch load. The device 110 is designed to fit inside a standard electrical panel board with up to forty-two branch circuit breakers 108. The device 110 is an accessory to a branch circuit breaker 108 allowing repetitive switching of the load without effecting operation of the circuit breaker 108.

The remote operator device 110 requires a means to receive command signals to open or close and to report back successful operation or device status. Also required is a means to drive opening and closing of the switch mechanism contacts. In accordance with the invention, the remote operator device is a multipole relay that uses two magnetically held solenoids as an actuator device and one electronic circuit board similar to a single pole device. With this design, electronic control circuitry is located inside the switching device itself. Only one circuit is needed to operate both actuators. The use of two magnetically held solenoids or "mag latches" as switching actuators results in very low energy requirements, requires short duration pulses to change position (measured in milliseconds), provides accurate and repeatable timing and requires that the control must reverse voltage polarity.

Figure 5:
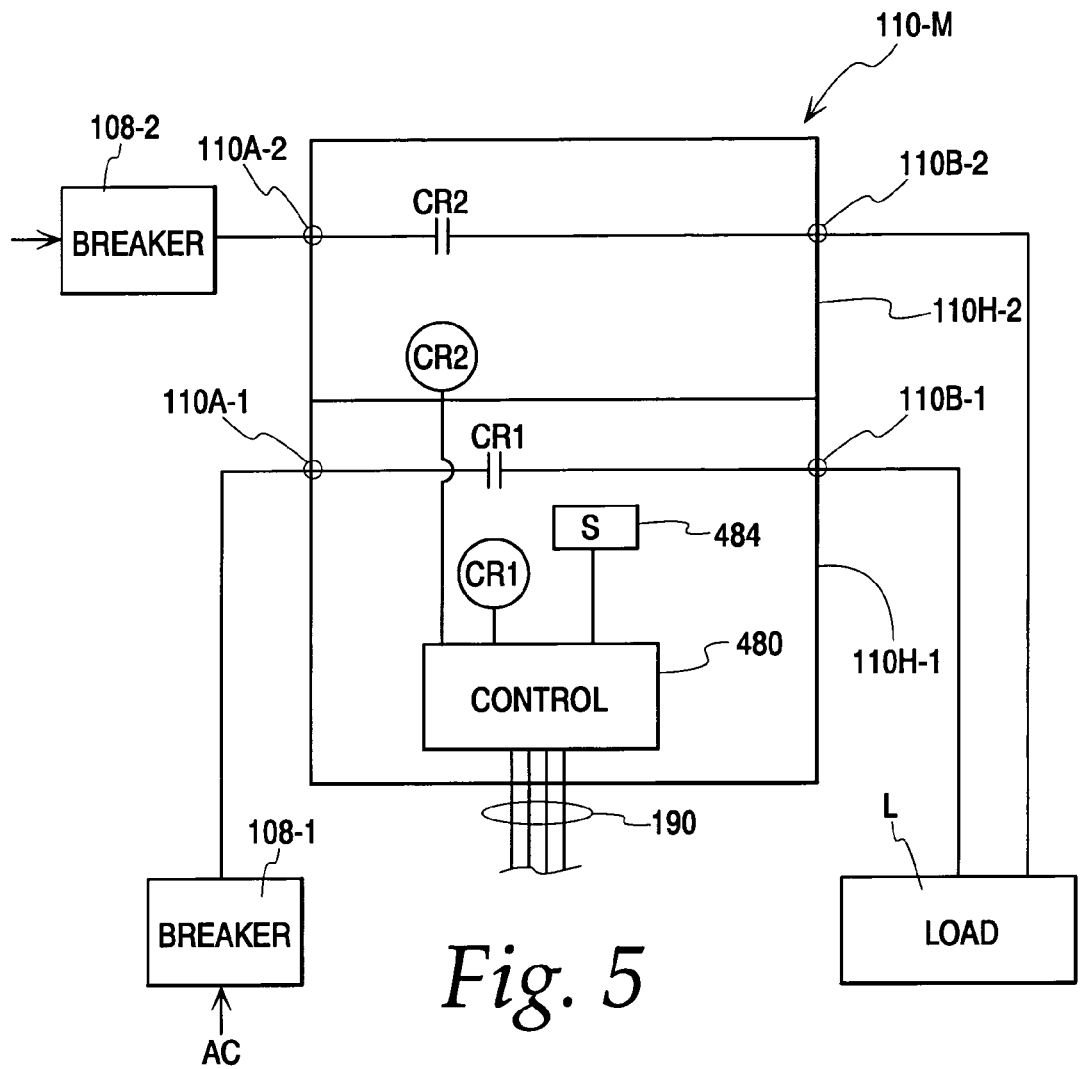
FIG. 5 is a basic block diagram of a multipole remote operated relay in accordance with the invention.

FIG. 5 illustrates a basic block diagram for multipole load switching. The remote operated device, in the form of a multipole remote operated relay 110-M includes two housings 110H-1 and 110H-2 connected together to form a two pole housing, as generally illustrated. The two pole housing occupies two positions in the panel 100. A control circuit 480 in the first housing 110H-1 is connected to the cable 190. The control circuit 480 drives two control relays CR1 and CR2, in the respective housings 110H-1 and 110H-2, each having a normally open contact connected between terminals 110A-1 and 110B-1, and 110A-2 and 110B-2, respectively. A sensor 484 senses status of the relays CR1 and CR2 and is connected to the control circuit 480. As such, the control circuit 480 controls operation of the contacts CR1 and CR2 to selectively electrically connect a load L to the breakers 108-1 and 108-2, and thus to power the load L.

Figure 6:
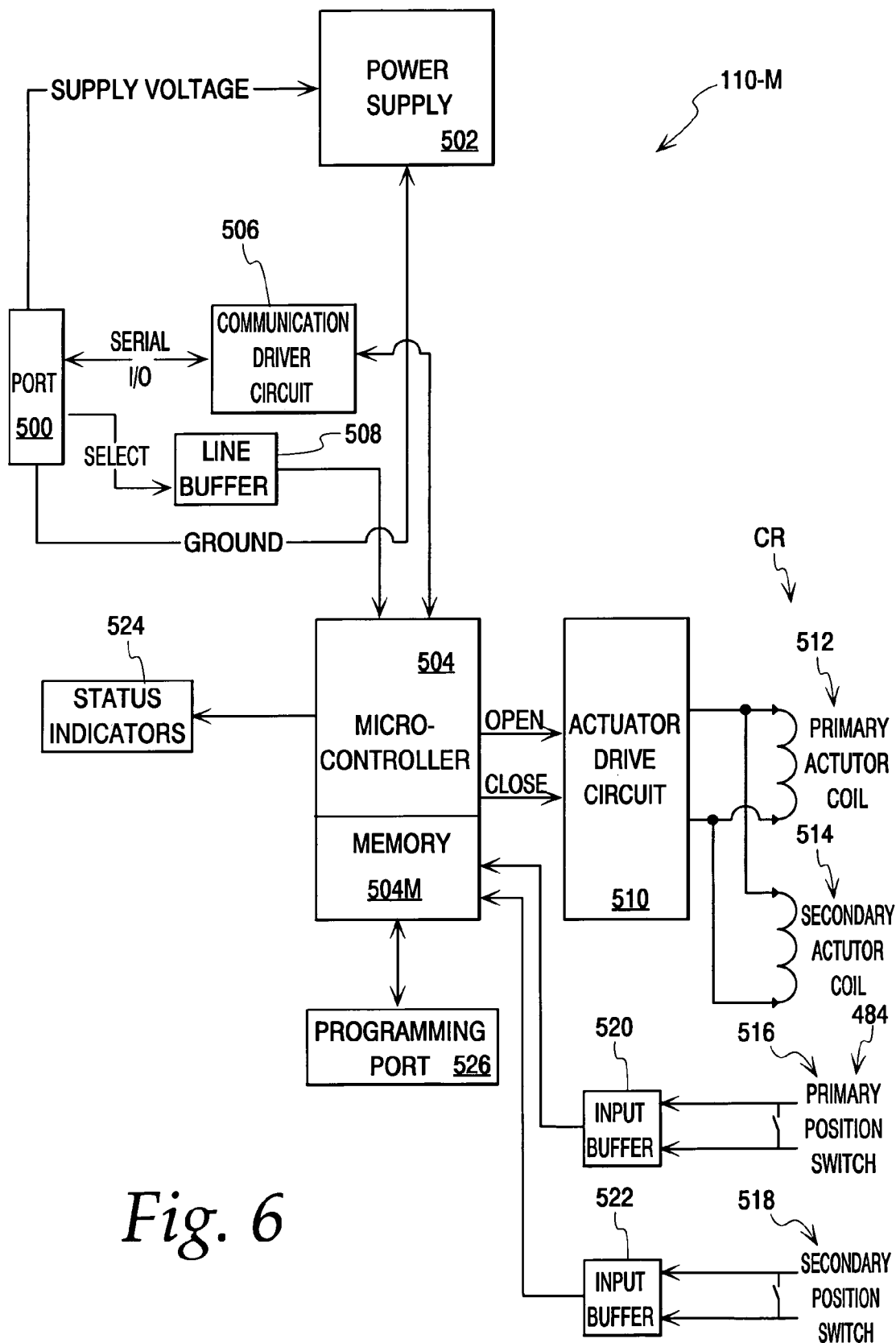
FIG. 6 is a detailed block diagram of the multipole remote operated relay of FIG. 5.

FIG. 6 illustrates a detailed block diagram of the remote operated device 110-M. Connection to the data rail 112 is through a four wire port 500. The port 500 includes a positive supply voltage and ground, a serial communication line, and a select line, as discussed above. The supply voltage and ground are fed to a power supply 502 to generate voltage as needed for a microcontroller 504 and other circuits. A communication driver circuit 506 is used to isolate and drive a single wire serial communication line between the microcontroller 504 and the port 500 and thus the data rail 112. As discussed above, the single wire connection to each remote operated device 110 and to the I/O controller 124 is used to transmit and receive commands and data. This provides necessary isolation and protection. In the event of an individual device failure, the remainder of the devices continue to operate properly. The select line from the port 500 is buffered in a line buffer 508 and connected to the microcontroller 504. This select line is used to enable or disable communications to and from the remote operated device 110-M. By selecting more than one remote operated device, the I/O controller 124 can send commands or messages to multiple devices 110 at the same time, reducing traffic on the serial communication bus.

The microcontroller 504 comprises a conventional microcontroller and associated memory 504M, the memory storing software to run in the microcontroller 504.

Figure 7:
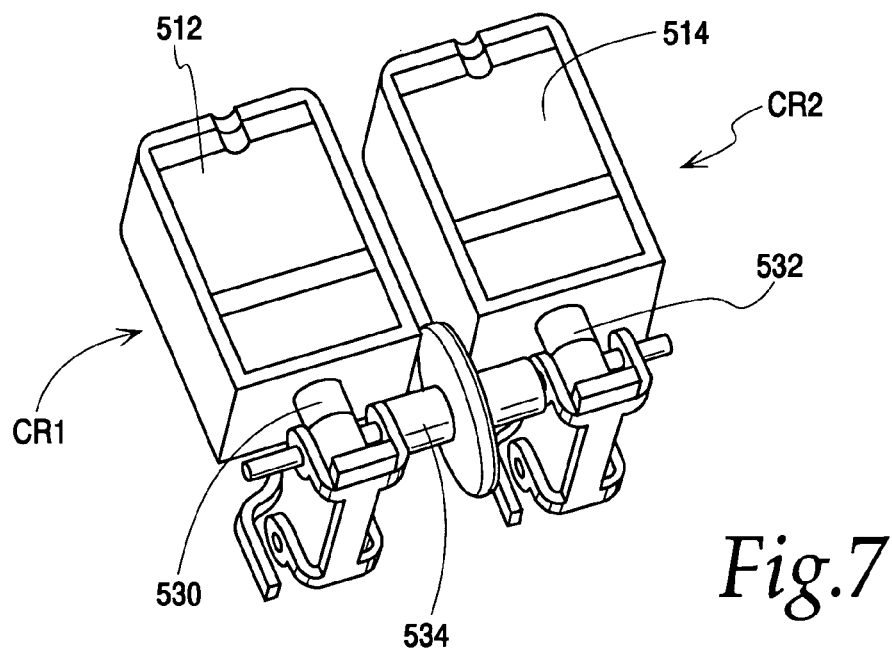
FIG. 7 is a perspective view illustrating mechanical linking of solenoids in the multipole remote operated relay of FIG. 5.

The microcontroller 504 has OPEN and CLOSE lines to an actuator drive circuit 510. The control relays CR1 and CR2 in the illustrated embodiment of the invention comprise magnetically held solenoids including a primary actuator coil 512 and a secondary actuator coil 514, see also FIG. 7, connected in parallel to the actuator drive circuit 510. The actuator drive circuit 510 provides current for both coils 512 and 514. An OPEN signal causes the drive circuit to apply negative voltage to the actuator coils for a short period of time (about 10 to 30 milliseconds). This causes actuator plungers 530 and 532 to pull-in and become magnetically latched or held in the open position to open the contacts CR1 and CR2, see FIG. 5, in a conventional manner. The plungers 530 and 532 are mechanically linked by a tie bar 534. Power is then removed from the coils 512 and 514. A CLOSE signal from the microcontroller 504 causes the drive circuit 510 to apply a positive voltage to the actuator coils 512 and 514 for a shorter period of time (about 2 to 3 milliseconds). This period of time is sufficient for the actuator plungers 530 and 532 to become unlatched or released and springs force them to the closed position to close the contacts CR1 and CR2, see FIG. 5. Again, power is then removed from the coils 512 and 514. Since the actuators are stable in both the open and closed positions, energy is only required to change position. This results in low energy solution even with two coils in parallel. Also included in the actuator drive circuit 510 is protection from both open and closed signals applied at the same time, which could result in a short circuit of the power supply 502. In the case of a three pole device, the actuators are located in the outer poles and a tie bar actuates the center pole.

Feedback for actuator plunger positions is provided by the sensor 484 in the form of two auxiliary position switches, a primary position switch 516 and a secondary position switch 518, such as auxiliary relay contacts. In the event of a three pole device, the secondary auxiliary switch is actually two switches wired in parallel so that both poles have to be open to indicate open to the microcontroller 504. The signals are buffered in respective input buffers 520 and 522 and then connected to the microcontroller 504. The microcontroller 504 uses the feedback information to respond to an I/O controller request for status or to retry a failed open or close attempt.

Additionally, the microcontroller 504 can send signals to various types of status indicators 524 such as LEDs to show open, closed, communications OK, operating properly, low voltage, etc. A programming port 526 can be used to program or update the microcontroller software or to load parameters such as on/off pulse rates or to troubleshoot the device 110.

Thus, in accordance with the invention there is provided a multipole remote operated relay in an electrical power distribution system.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

I claim:

1. A remote operated device for slectively distributing electrical power from an electrical power source to load circuits comprising:
    a housing mountable in a distribution panel;
    a multipole switching device in the housing, comprising first and second relays; and
    a switch control in the housing for controlling the switching device, the switch control comprising a control circuit for operating the switching device responsive to control commands and a communication circuit for receiving control commands from a remote controller, wherein the first and second relays are parallel connected to the control circuit.

2. A remote operated device for selectively distributing electrical power from an electrical power source to load circuits comprising:
    a housing mountable in a distribution panel;
    a multipole switching device in the housing, comprising first and second relays, wherein the first and second relays are mechanically linked; and
    a switch control in the housing for controlling the switching device, the switch control comprising a control circuit for operating the switching device responsive to control commands and a communication circuit for receiving control commands from a remote controller.

3. A remote operated device for selectively distributing electrical power from an electrical power source to load circuits comprising:
    a housing mountable in a distribution panel;
    a multipole switching device in the housing, wherein the multipole switching device comprises first and second magnetically held solenoids; and
    a switch control in the housing for controlling the switching device, the switch control comprising a control circuit for operating the switching device responsive to control commands and a communication circuit for receiving control commands from a remote controller.

4. The remote operated device of claim 3 wherein the control circuit develops relatively short duration latch and unlatch signals to the solenoids.

5. The remote operated device of claim 4 wherein duration of the latch signal is greater than duration of the unlatch signal.

6. A remote operated device for selectively distributing electrical power from an electrical power source to load circuits comprising:
    a housing mountable in a distribution panel;
    a multipole switching device in the housing; and
    a switch control in the housing for controlling the switching device, the switch control comprising a control circuit for operating the switching device responsive to control commands and a communication circuit for receiving control commands from a remote controller further comprising a sensing device for sensing position of the switching device.

7. The remote operated device of claim 6 wherein the multipole switching device comprises first and second relays and the sensing device comprises auxiliary contacts.

8. An electrical distribution system for selectively connecting an electrical power source to load devices, comprising:
  a panelboard having a plurality of load circuit positions;
  a remote operated relay mountable in the panelboard in an adjacent pair of the load circuit positions comprising a multiple switching device, and a switch control for controlling the switching device, the switch control comprising a control circuit for operating the switching device responsive to control commands and a communication circuit for receiving control commands; and
  an input/output (I/O) controller mounted in the panelboard for controlling operation of the remote operated relay, the I/O controller comprising a programmed controller for generating the control commands for commanding operation of the remote operated relay, the control system including a communication circuit for communication with the remote operated relay communication circuit.

9. The electrical distribution system of claim 8 wherein the multipole switching device comprises first and second relays.

10. The electrical distribution system of claim 9 wherein the first and second relays are parallel connected to the control circuit.

11. The electrical distribution system of claim 9 wherein the first and second relays are mechanically linked.

12. The electrical distribution system of claim 8 wherein the multipole switching device comprises first and second magnetically held solenoids.

13. The electrical distribution system of claim 12 wherein the control circuit develops relatively short duration latch and unlatch signals to the solenoids.

14. The electrical distribution system of claim 13 wherein duration of the latch signal is greater than duration of the unlatch signal.

15. The electrical distribution system of claim 8 wherein the remote operated relay further comprises a sensing device for sensing position of the switching device.

16. The electrical distribution system of claim 15 wherein the multipole switching device comprises first and second relays and the sensing device comprises auxiliary contacts.

17. The electrical distribution system of claim 15 wherein the switch control transfers status information to the I/O controller.

* * * * *